United States Patent
Durali et al.

(10) Patent No.: US 12,422,045 B2
(45) Date of Patent: Sep. 23, 2025

(54) HYDRAULIC DIRECTIONAL CONTROL VALVE

(71) Applicants: Mohammad Durali, Tehran (IR); Parastoo Ebrahimi, Tehran (IR); Maryam Sharifzadeh, Tehran (IR); Alireza Alem Rajabi, Robat karim (IR); Seyed Mahdi Hosseini, Tehran (IR)

(72) Inventors: Mohammad Durali, Tehran (IR); Parastoo Ebrahimi, Tehran (IR); Maryam Sharifzadeh, Tehran (IR); Alireza Alem Rajabi, Robat karim (IR); Seyed Mahdi Hosseini, Tehran (IR)

( * ) Notice: Subject to any disclaimer, the term of this patent is extended or adjusted under 35 U.S.C. 154(b) by 154 days.

(21) Appl. No.: 18/346,830

(22) Filed: Jul. 4, 2023

(65) Prior Publication Data
US 2024/0003437 A1    Jan. 4, 2024

Related U.S. Application Data

(63) Continuation-in-part of application No. PCT/IB2022/050033, filed on Jan. 4, 2022.

(60) Provisional application No. 63/133,425, filed on Jan. 4, 2021.

(51) Int. Cl.
| | |
|---|---|
| *F16K 11/07* | (2006.01) |
| *F15B 13/02* | (2006.01) |
| *F16K 27/04* | (2006.01) |
| *F16K 31/363* | (2006.01) |

(52) U.S. Cl.
CPC .............. *F16K 11/07* (2013.01); *F15B 13/02* (2013.01); *F16K 27/041* (2013.01); *F16K 31/363* (2013.01); *F15B 2211/329* (2013.01); *F16K 11/0716* (2013.01); *Y10T 137/86879* (2015.04)

(58) Field of Classification Search
CPC ...... F16K 11/07; F16K 27/041; F16K 31/363; F16K 31/38; F16K 5/18; F16K 11/0716; F15B 13/0402; F15B 2211/329; F15B 20/002; F15B 20/008; F15B 2211/30525; F15B 2211/31; F15B 2211/8752; F15B 2211/8755
USPC ..................... 137/625–625.49, 884
See application file for complete search history.

(56) References Cited

U.S. PATENT DOCUMENTS

| | | | | |
|---|---|---|---|---|
| 3,357,444 A | * | 12/1967 | Zeuner ..................... | F15B 13/02 137/625.62 |
| 3,536,085 A | * | 10/1970 | Taplin .................. | F15B 13/0402 137/809 |
| 4,729,408 A | * | 3/1988 | Coutant ................ | F16D 48/062 137/637.1 |
| 5,598,871 A | * | 2/1997 | Sturman .............. | F16K 31/0613 137/625.68 |
| 6,474,353 B1 | * | 11/2002 | Sturman ............... | F15B 13/044 137/625.65 |

(Continued)

*Primary Examiner* — Craig J Price

(57) ABSTRACT

A pilot operated hydraulic directional control valve. The hydraulic directional control valve comprises a valve body, a spool, a spring and a control piston. The valve body comprises four top ports and four bottom ports. When a spring force which is applied to a first end of the spool is less than a piston force which is applied to a second end of the spool, the hydraulic directional control valve is in working position. When the spring force is greater than the piston force, the hydraulic directional control valve is in shutdown position.

6 Claims, 14 Drawing Sheets

(56) References Cited

U.S. PATENT DOCUMENTS

| | | | |
|---|---|---|---|
| 6,990,999 B2* | 1/2006 | Patel | F15B 13/0853 |
| | | | 137/884 |
| 10,174,771 B2* | 1/2019 | Miyazoe | F15B 13/0842 |
| 10,753,376 B2* | 8/2020 | Hori | F16K 31/0668 |
| 10,969,035 B2* | 4/2021 | Williams | B64C 13/42 |
| 11,015,719 B2* | 5/2021 | Ogino | F16K 1/425 |

* cited by examiner

100

100

150

HYDRAULIC DIRECTIONAL CONTROL VALVE

CROSS-REFERENCE TO RELATED APPLICATION

This application is a continuation-in-part of PCT/IB2022/050033 filed Jan. 4, 2022, and entitled "HYDRAULIC DIRECTIONAL CONTROL VALVE" which claims the benefit of priority from pending U.S. Provisional Patent Application Ser. No. 63/133,425, filed on Jan. 4, 2021, and entitled "HYDRAULIC DIRECTIONAL CONTROL VALVE 8/2," which are both incorporated herein by reference in their entirety.

TECHNICAL FIELD

The present disclosure generally relates to control valves. This disclosure, particularly, relates to control valves in hydraulic systems and, more particularly, relates to a pilot operated directional control valve in hydraulic systems.

BACKGROUND

In hydraulic control systems with high safety such as some governors, it is usually required that a system goes to a safe state in a shutdown. The normal shutdown is usually accomplished through a shutdown sequence controlled by an electronic system. Emergency shutdown may skip the shutdown procedure and may bring the system to a safe shutdown state even in absence of electric power. This may be done by utilizing a valve assembly called emergency shutdown valve. The control pressure in such systems plays an important role in functionality of the control system, and if lost, the system may go to a safe shutdown state. The control pressure may be monitored by a minimum pressure valve as a separate unit.

Current approaches for bringing a system to a safe shutdown state may cause more piping and space, and may also increase the complexity and cost of the system. Systems and approaches that are currently used for bringing a system to a safe shutdown state may also reduce the reliability and maintainability of the system. Therefore, there is, a need for shutdown and minimum pressure valves which are combined in one single unit.

SUMMARY OF THE DISCLOSURE

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a pilot operated hydraulic directional control valve. In an exemplary embodiment, the pilot operated hydraulic directional control valve may include a valve body with a hollow chamber, a spool, a spring, and a control piston.

In an exemplary embodiment, the valve body may include a first top port, a first top semicircular cavity, a first bottom port, a first bottom semicircular cavity, a second top port, a second top semicircular cavity, a second bottom port, a second bottom semicircular cavity, a third top port, a third bottom port, a first connecting hole, a fourth top port, a fourth bottom port, a second connecting hole, an inclined connecting hole.

In an exemplary embodiment, the first top port may be provided at a top surface of the valve body. In an exemplary embodiment, the first top port may be in fluid communication with an outer space of the valve body. In an exemplary embodiment, the first top semicircular cavity may be located between the first top port and the hollow chamber. In an exemplary embodiment, the first top semicircular cavity may be configured to provide fluid communication between the first top port and the hollow chamber. In an exemplary embodiment, the first top port may include an inclined tube. In an exemplary embodiment, the inclined tube may be directly connected to the first top semicircular cavity.

In an exemplary embodiment, the first bottom port may be provided at a bottom surface of the valve body. In an exemplary embodiment, the first bottom port may be associated with the first top port. In an exemplary embodiment, the first bottom port may be in fluid communication with the outer space of the valve body. In an exemplary embodiment, the first bottom semicircular cavity may be located between the first bottom port and the hollow chamber. In an exemplary embodiment, the first bottom semicircular cavity may be configured to provide fluid communication between the first bottom port and the hollow chamber.

In an exemplary embodiment, the second top port may be provided at the top surface of the valve body. In an exemplary embodiment, the second top port may be in fluid communication with the outer space of the valve body. In an exemplary embodiment, the second top semicircular cavity may be located between the second top port and the hollow chamber. In an exemplary embodiment, the second top semicircular cavity may be configured to provide fluid communication between the second top port and the hollow chamber.

In an exemplary embodiment, the second bottom port may be provided at the bottom surface of the valve body. In an exemplary embodiment, the second bottom port may be associated with the second top port. In an exemplary embodiment, the second bottom port may be in fluid communication with the outer space of the valve body. In an exemplary embodiment, the second bottom semicircular cavity may be located between the second bottom port and the hollow chamber. In an exemplary embodiment, the second bottom semicircular cavity may be configured to provide fluid communication between the second bottom port and the hollow chamber.

In an exemplary embodiment, the third top port may be provided at the top surface of the valve body. In an exemplary embodiment, the third top port may be in fluid communication with an outer space of the valve body. In an exemplary embodiment, the third bottom port may be provided at the bottom surface of the valve body. In an exemplary embodiment, the third bottom port may be associated with the third top port. In an exemplary embodiment, the third bottom port may be in fluid communication with the outer space of the valve body.

In an exemplary embodiment, the first connecting hole may be provided between the third top port and the third bottom port. In an exemplary embodiment, the first connecting hole may be configured to provide fluid communication between the third top port and the third bottom port. In an exemplary embodiment, the fourth top port may be provided at the top surface of the valve body. In an exemplary embodiment, the fourth top port may be in fluid communication with the outer space of the valve body.

In an exemplary embodiment, the fourth bottom port may be provided at the bottom surface of the valve body. In an exemplary embodiment, the fourth bottom port may be associated with the fourth top port. In an exemplary embodiment, the fourth bottom port may be in fluid communication with the outer space of the valve body. In an exemplary embodiment, the second connecting hole may be provided between the fourth top port and the fourth bottom port. In an exemplary embodiment, the second connecting hole may be configured to provide fluid communication between the fourth top port and the fourth bottom port. In an exemplary embodiment, the inclined connecting hole may be between the fourth bottom port and the hollow chamber.

In an exemplary embodiment, the spool may be disposed slidably inside the hollow chamber. In an exemplary embodiment, an outer diameter of the spool may correspond to an inner diameter of the hollow chamber. In an exemplary embodiment, the spool may be configured to move linearly inside the hollow chamber along a first axis. In an exemplary embodiment, the first axis may correspond to a main longitudinal axis of the hollow chamber. In an exemplary embodiment, the spool may include a first sealing part, a second sealing part, a middle sealing part, a first circular gap, and a second circular gap.

In an exemplary embodiment, the first sealing part may be at a first end of the spool. In an exemplary embodiment, an outer diameter of the first sealing part may correspond to the inner diameter of the hollow chamber. In an exemplary embodiment, the second sealing part may be at a second end of the spool. In an exemplary embodiment, an outer diameter of the second sealing part may correspond to the inner diameter of the hollow chamber. In an exemplary embodiment, the middle sealing part may be at a middle of the spool. In an exemplary embodiment, an outer diameter of the middle sealing part may correspond to the inner diameter of the hollow chamber. In an exemplary embodiment, the first circular gap may be between the first sealing part and the middle sealing part. In an exemplary embodiment, the second circular gap may be between the second sealing part and the middle sealing part.

In an exemplary embodiment, the spring may be attached to the first end of the spool. In an exemplary embodiment, the spring may be configured to urge the spool to move linearly along the first axis and in a first direction by applying a spring force to the first end of the spool. In an exemplary embodiment, the control piston may be attached to the second end of the spool. In an exemplary embodiment, the control piston may be configured to urge the spool to move linearly along the first axis in a second direction by applying a piston force to the second end of the spool.

In an exemplary embodiment, when the spool is placed at a first end of the hollow chamber, the first circular gap may be aligned with the first top semicircular cavity and the first bottom semicircular cavity and, thereby, the first circular gap, the first top semicircular cavity, and the first bottom semicircular cavity may provide fluid communication between the first top port and the first bottom port. Furthermore, the second circular gap may be aligned with the second top semicircular cavity and the second bottom semicircular cavity and, thereby, the second circular gap, the second top semicircular cavity, and the second bottom semicircular cavity may provide fluid communication between the first top port and the first bottom port.

In an exemplary embodiment, when the spool is placed at a second end of the hollow chamber, the first circular gap may be misaligned with the with the first top semicircular cavity, the first sealing part may block the first top semicircular cavity and the first top port, the second circular gap may be misaligned with the second top semicircular cavity, the second sealing part may block the second top semicircular cavity and the second top port, the first bottom port may be connected to the first connecting hole, and the first bottom port may be connected to the first connecting hole.

In an exemplary embodiment, when the piston force is greater than the spring force, the spring and the control piston may place the spool at the first end of the hollow chamber. In an exemplary embodiment, when the spring force is greater than the piston force, the spring and the control piston may place the spool at the second end of the hollow chamber.

BRIEF DESCRIPTION OF THE DRAWINGS

The drawing figures depict one or more implementations in accord with the present teachings, by way of example only, not by way of limitation. In the figures, like reference numerals refer to the same or similar elements.

DESCRIPTION OF EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary embodiments of a hydraulic directional control valve. In an exemplary embodiment, the disclosed hydraulic control valve may serve two functions namely emergency shutdown and minimum pressure action which may be combined in one single hydraulic valve which may make it a multi-purpose valve. In an exemplary embodiment, the disclosed hydraulic control valve may be used in hydropower governors as one of its vast applications. In an exemplary embodiment, a hydropower governor may refer to a controller of a hydraulic turbine in a power plant that may vary the water flow through the hydraulic turbine to control its speed or power output.

Figure 1A:
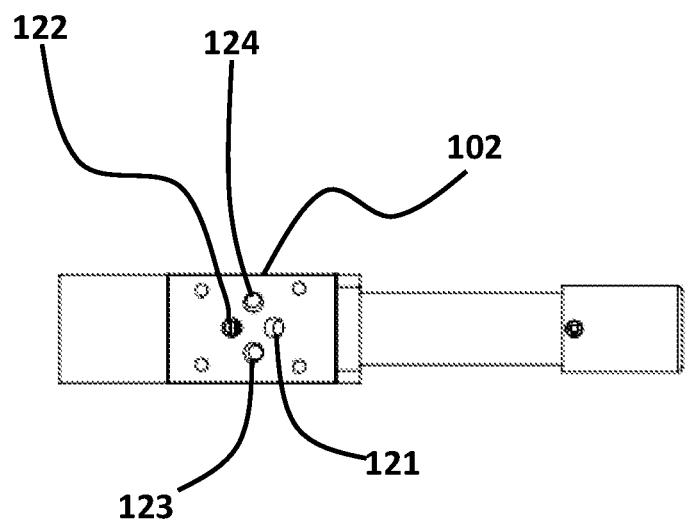
FIG. 1A illustrates a top view of a hydraulic directional control valve, consistent with one or more exemplary embodiments of the present disclosure.
Figure 1B:
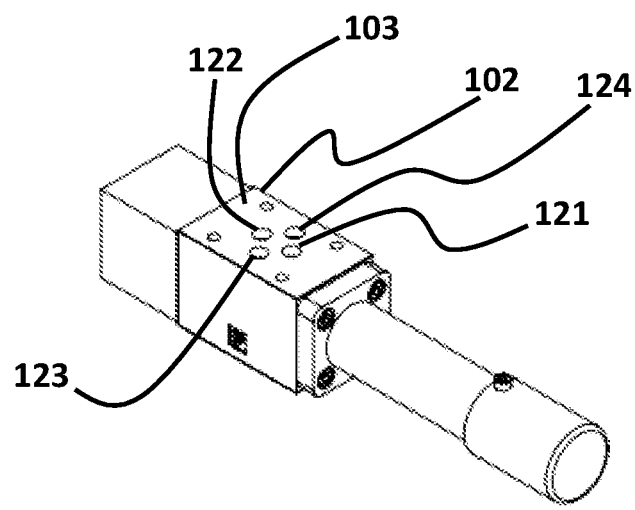
FIG. 1B illustrates a perspective view of a hydraulic directional control valve, consistent with one or more exemplary embodiments of the present disclosure.
Figure 1C:
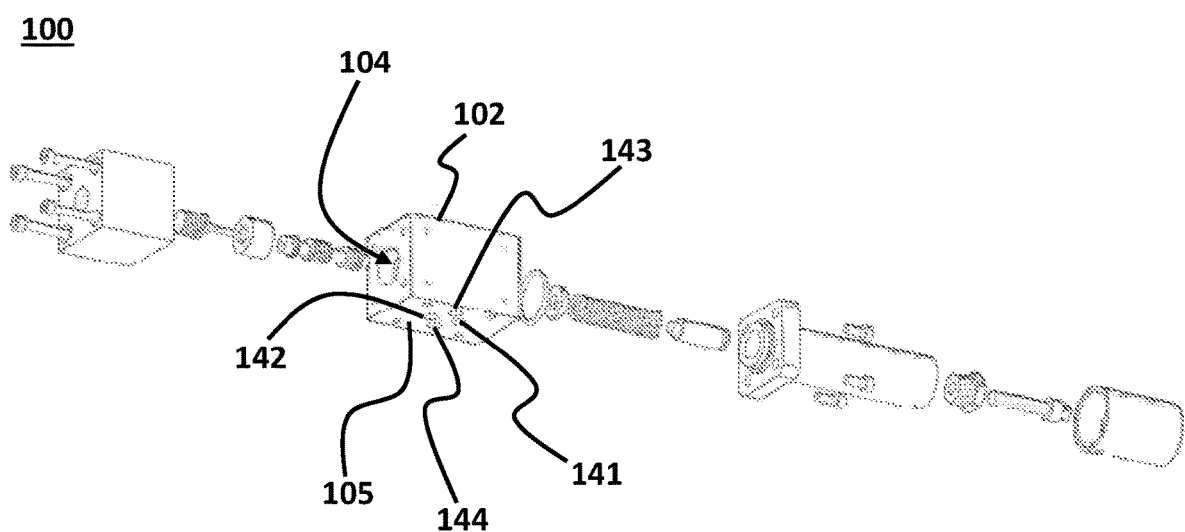
FIG. 1C illustrates an exploded view of a hydraulic directional control valve, consistent with one or more exemplary embodiments of the present disclosure.
Figure 1D:
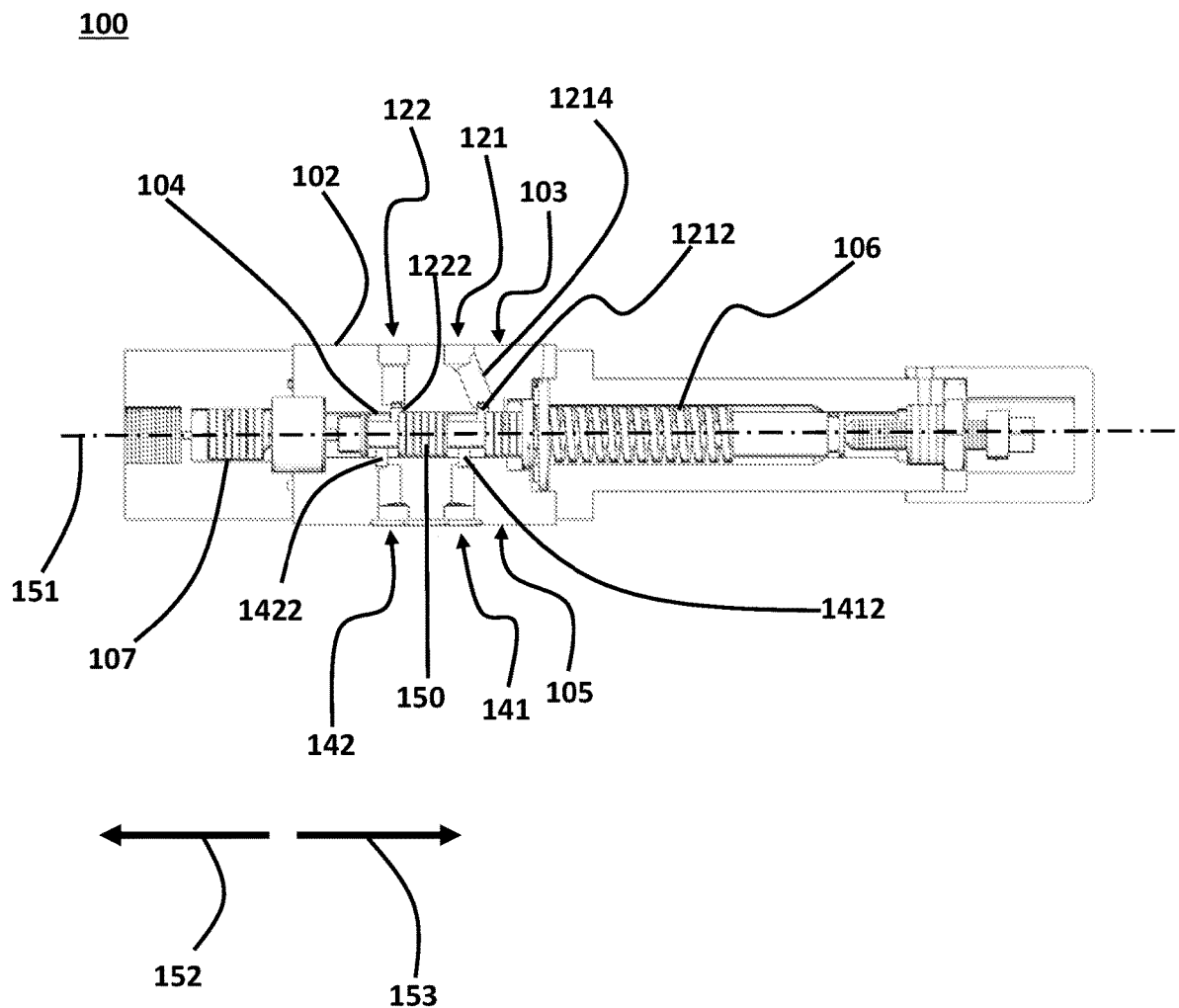
FIG. 1D illustrates a sectional view of a hydraulic directional control valve, consistent with one or more exemplary embodiments of the present disclosure.
Figure 2:
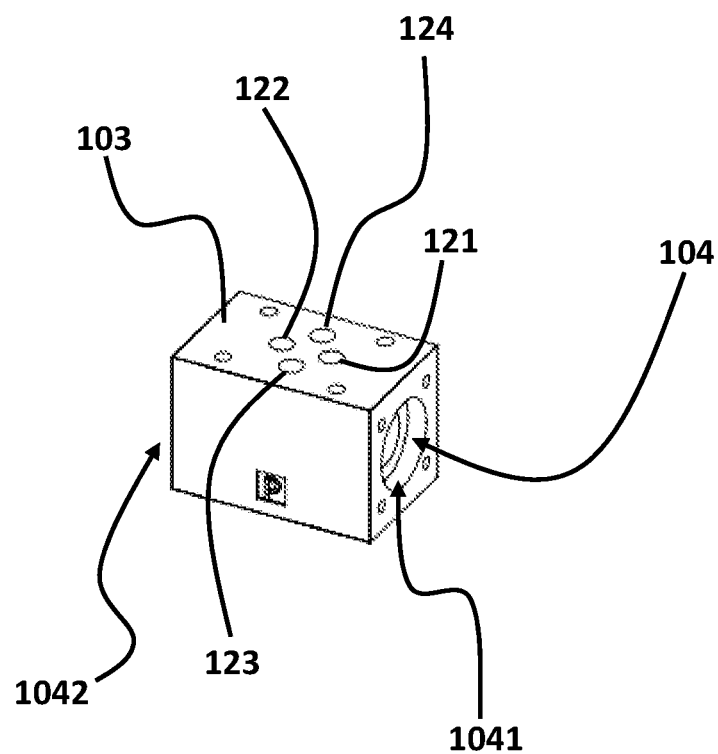
FIG. 2 illustrates a perspective view of a valve body, consistent with one or more exemplary embodiments of the present disclosure.

FIG. 1A shows a top view of a hydraulic directional control valve 100, consistent with one or more exemplary embodiments of the present disclosure. FIG. 1B shows a perspective view of hydraulic directional control valve 100, consistent with one or more exemplary embodiments of the present disclosure. FIG. 1C shows an exploded view of hydraulic directional control valve 100, consistent with one or more exemplary embodiments of the present disclosure. FIG. 1D shows a sectional view of hydraulic directional control valve 100, consistent with one or more exemplary embodiments of the present disclosure. As shown in FIG. 1A, FIG. 1B, FIG. 1C, and FIG. 1D, in an exemplary embodiment, hydraulic directional control valve 100 may include a valve body 102 with a hollow chamber 104. FIG. 2 shows a perspective view of valve body 102, consistent with one or more exemplary embodiments of the present disclosure.

In an exemplary embodiment, valve body 102 may include a first top port 121, a second top port 122, a third top port 123, and a fourth top port 124. In an exemplary embodiment, first top port 121, second top port 122, third top port 123, and fourth top port 124 may be provided on a top surface 103 of valve body 102. In an exemplary embodiment, first top port 121, second top port 122, third top port 123, and fourth top port 124 may be in fluid communication with an outer space of valve body 102. In an exemplary embodiment, each of first top port 121, second top port 122, third top port 123, and fourth top port 124 may be connected to a respective corresponding port of another valve (not illustrated). In an exemplary embodiment, when a respective port from first top port 121, second top port 122, third top port 123, and fourth top port 124 is connected to a respective corresponding port of another valve (not illustrated), the respective port may be in fluid communication with a corresponding port of the other valve. For example, fluid may be able to go from the port of the other valve to the respective port or fluid may be able to go from the respective port to the port of the other valve.

In an exemplary embodiment, valve body 102 may further include a first top semicircular cavity 1212 located between first top port 121 and hollow chamber 104. In an exemplary embodiment, first top semicircular cavity 1212 may allow or may be configured to provide fluid communication between first top port 121 and hollow chamber 104. In an exemplary embodiment, as first top semicircular cavity 1212 is between first top port 121 and hollow chamber 104, fluid may flow from first top port 121 into first top semicircular cavity 1212 and then may flow from first top semicircular cavity 1212 into hollow chamber 104. Also, in an exemplary embodiment, as first top semicircular cavity 1212 is between first top port 121 and hollow chamber 104, fluid may flow from hollow chamber 104 into first top semicircular cavity 1212 and then flow from first top semicircular cavity 1212 into first top port 121. In an exemplary embodiment, first top port 121 may include an inclined tube 1214. In an exemplary embodiment, inclined tube 1214 may be directly connected to first top semicircular cavity 1212. In an exemplary embodiment, valve body 102 may further include a second top semicircular cavity 1222 located between second top port 122 and hollow chamber 104. In an exemplary embodiment, second top semicircular cavity 1222 may allow or may be configured to provide fluid communication between second top port 122 and hollow chamber 104. In an exemplary embodiment, as second top semicircular cavity 1222 is between second top port 122 and hollow chamber 104, fluid may flow from second top port 122 into second top semicircular cavity 1222 and then flow from second top semicircular cavity 1222 into hollow chamber 104. Also, in an exemplary embodiment, as second top semicircular cavity 1222 is between second top port 122 and hollow chamber 104, fluid may flow from hollow chamber 104 into second top semicircular cavity 1222 and then flow from second top semicircular cavity 1222 into second top port 122.

Figure 3:
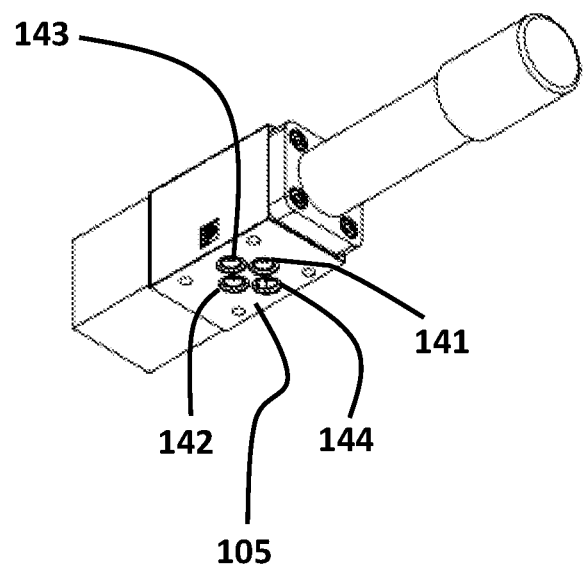
FIG. 3 illustrates a bottom view of a hydraulic directional control valve, consistent with one or more exemplary embodiments of the present disclosure.

FIG. 3 shows a bottom view of hydraulic directional control valve 100, consistent with one or more exemplary embodiments of the present disclosure. As shown in FIG. 3, in an exemplary embodiment, valve body 102 may further include a first bottom port 141, a second bottom port 142, a third bottom port 143, and a fourth bottom port 144. In an exemplary embodiment, first bottom port 141, second bottom port 142, third bottom port 143, and fourth bottom port 144 may be provided on a bottom surface 105 of valve body 102. In an exemplary embodiment, first top port 121, second top port 122, third top port 123, and fourth top port 124 may be in fluid communication with an outer space of valve body 102. In an exemplary embodiment, each of first bottom port 141, second bottom port 142, third bottom port 143, and fourth bottom port 144 may be connected to a hose, a tube, or a respective port of another valve. In an exemplary embodiment, when a respective port from first bottom port 141, second bottom port 142, third bottom port 143, and fourth bottom port 144 is connected to a respective tube, the respective port may be in fluid communication with the respective tube. For example, fluid may be able to go from the respective tube to the respective port or fluid may be able to go from the respective port to the respective tube. In an exemplary embodiment, when a respective port from first bottom port 141, second bottom port 142, third bottom port 143, and fourth bottom port 144 is connected to a port of another valve, the respective port may be in fluid communication with the port of the other valve. For example, fluid may be able to go from the respective tube to the port of the other valve or fluid may be able to go from the port of the other valve to the respective tube. In an exemplary embodiment, first bottom port 141 may be associated with first top port 121. In an exemplary embodiment, second bottom port 142 may be associated with second top port 122. In an exemplary embodiment, third bottom port 143 may be associated with third top port 123. In an exemplary embodiment, fourth bottom port 144 may be associated with fourth top port 124.

In an exemplary embodiment, valve body 102 may further include a first bottom semicircular cavity 1412 located between first bottom port 141 and hollow chamber 104. In an exemplary embodiment, first bottom semicircular cavity 1412 may allow or may be configured to provide fluid communication between first bottom port 141 and hollow chamber 104. In an exemplary embodiment, as first bottom semicircular cavity 1412 is between first bottom port 141 and hollow chamber 104, fluid may flow from first bottom port 141 into first bottom semicircular cavity 1412 and then may flow from first bottom semicircular cavity 1412 into hollow chamber 104. Also, in an exemplary embodiment, as first bottom semicircular cavity 1412 is between first bottom port 141 and hollow chamber 104, fluid may flow from hollow chamber 104 into first bottom semicircular cavity 1412 and then may flow from first bottom semicircular cavity 1412 into first bottom port 141. In an exemplary embodiment, valve body 102 may further include a second bottom semicircular cavity 1422 located between second bottom port 142 and hollow chamber 104. In an exemplary embodiment, second bottom semicircular cavity 1422 may allow or may be configured to provide fluid communication between second bottom port 142 and hollow chamber 104. In an exemplary embodiment, as second bottom semicircular cavity 1422 is between second bottom port 142 and hollow chamber 104, fluid may flow from second bottom port 142 into second bottom semicircular cavity 1422 and then may flow from second bottom semicircular cavity 1422 into hollow chamber 104. Also, in an exemplary embodiment, fluid may flow from hollow chamber 104 into second bottom semicircular cavity 1422 and then may flow from second bottom semicircular cavity 1422 into second bottom port 142.

Figure 4A:
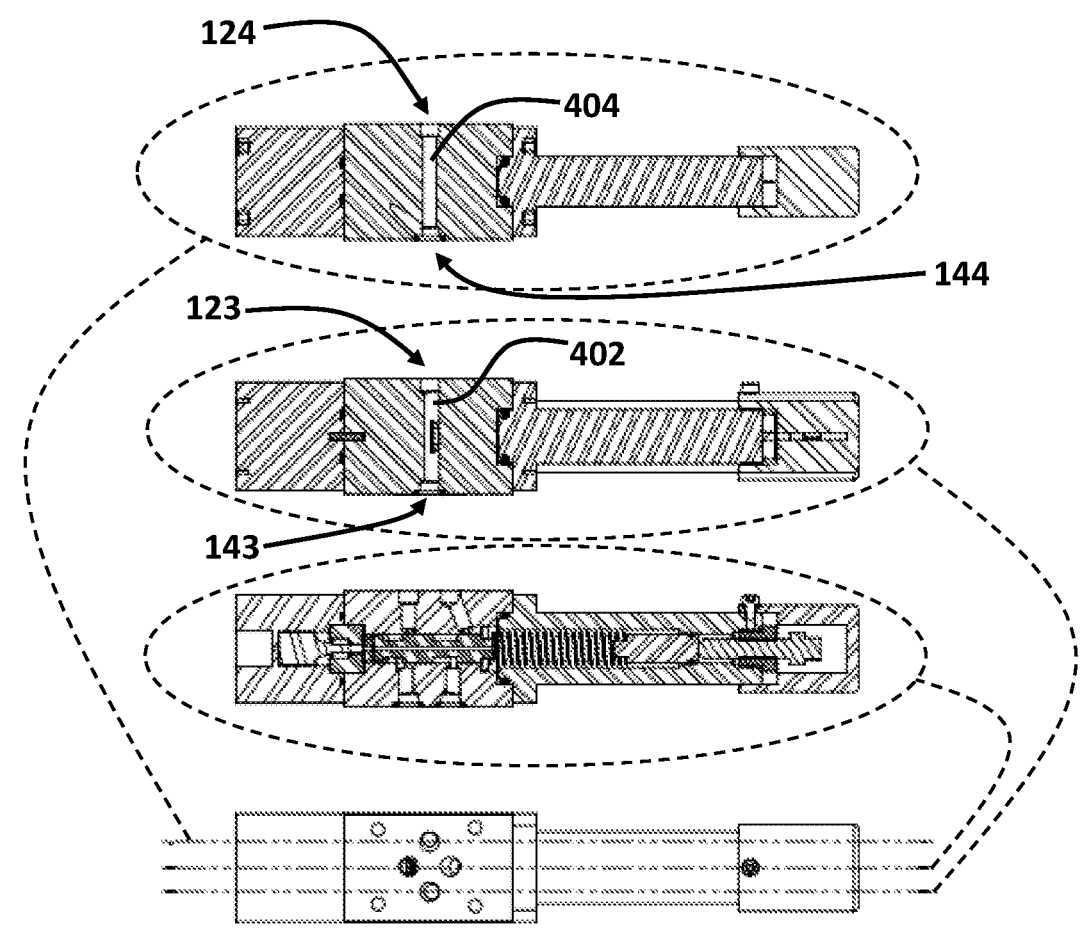
FIG. 4A illustrates a top view and three sectional views of a hydraulic directional control valve, consistent with one or more exemplary embodiments of the present disclosure.
Figure 4B:
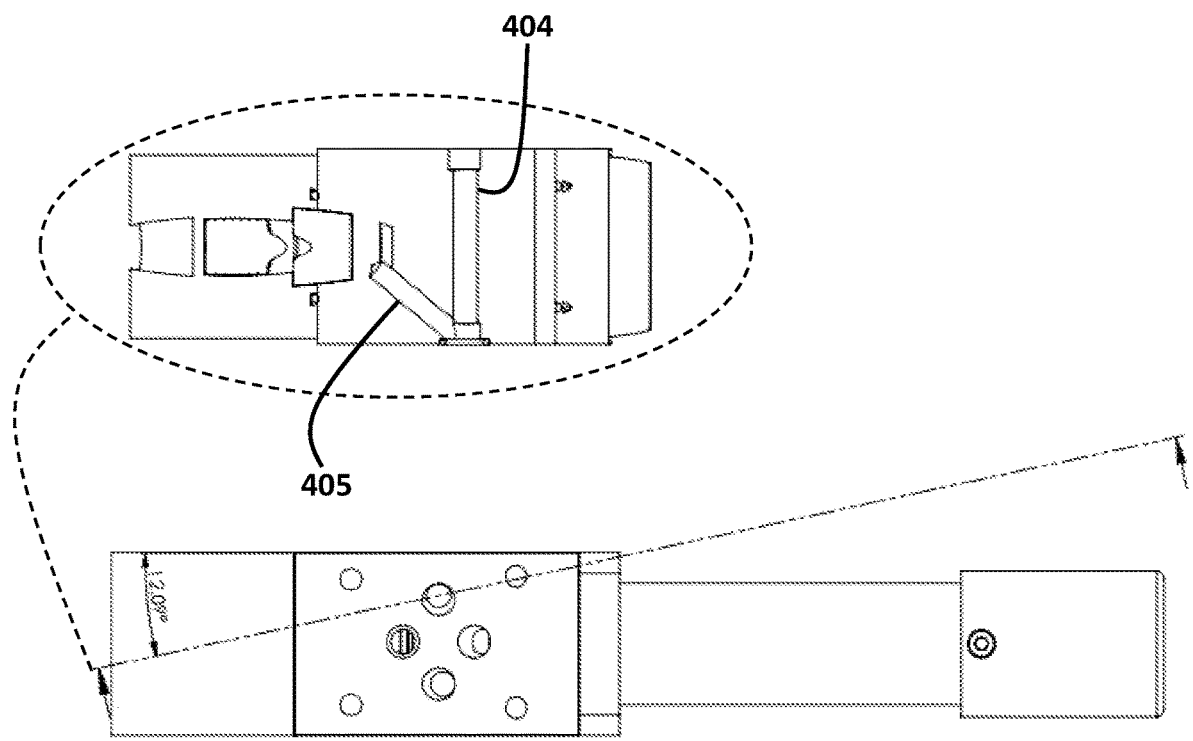
FIG. 4B illustrates a top view and a sectional view of a hydraulic directional control valve, consistent with one or more exemplary embodiments of the present disclosure.

FIG. 4A shows a top view and three sectional views of hydraulic directional control valve 100, consistent with one or more exemplary embodiments of the present disclosure. As shown in FIG. 4A, in an exemplary embodiment, valve body 102 may further include a first connecting hole 402 and a second connecting hole 404. In an exemplary embodiment, first connecting hole 402 may be provided between third top port 123 and third bottom port 143. In an exemplary embodiment, first connecting hole 402 may allow or be configured to provide fluid communication between third top port 123 and third bottom port 143. In an exemplary embodiment, as first connecting hole 402 is between third top port 123 and third bottom port 143, fluid may flow from third top port 123 into first connecting hole 402 and then may flow from first connecting hole 402 into third bottom port 143. Also, in an exemplary embodiment, as first connecting hole 402 is between third top port 123 and third bottom port 143, fluid may flow from third bottom port 143 into first connecting hole 402 and then may flow from first connecting hole 402 into third top port 123. In an exemplary embodiment, second connecting hole 404 may be provided between fourth top port 124 and fourth bottom port 144. In an exemplary embodiment, second connecting hole 404 may allow or may be configured to provide fluid communication between fourth top port 124 and fourth bottom port 144. In an exemplary embodiment, as second connecting hole 404 is between fourth top port 124 and fourth bottom port 144, fluid may flow from fourth top port 124 into second connecting hole 404 and then may flow from second connecting hole 404 into fourth bottom port 144. Also, in an exemplary embodiment, as second connecting hole 404 is between fourth top port 124 and fourth bottom port 144, fluid may flow from fourth bottom port 144 into second connecting hole 404 and then may flow from second connecting hole 404 into fourth top port 124. FIG. 4B shows a top view and a sectional view of hydraulic directional control valve 100, consistent with one or more exemplary embodiments of the present disclosure. As shown in FIG. 4B, in an exemplary embodiment, valve body 102 may further include an inclined connecting hole 405. In an exemplary embodiment, inclined connecting hole 405 may be provided between fourth bottom port 144 and hollow chamber 104.

As further shown in FIG. 1C and FIG. 1D, in an exemplary embodiment, hydraulic directional control valve 100 may further include a spool 150. In an exemplary embodiment, spool 150 may be disposed slidably inside hollow chamber 104. In an exemplary embodiment, when spool 150 is disposed slidably inside hollow chamber 104, it may mean that spool 150 is disposed inside hollow chamber 104 in such a way that spool 150 is allowed to move back and forth along a first axis 151. In an exemplary embodiment, first axis 151 may correspond to a main longitudinal axis of hollow chamber 104 and a main longitudinal axis of spool 150. In an exemplary embodiment, an outer diameter of spool 150 may correspond to an inner diameter of hollow chamber 104.

Figure 5A:
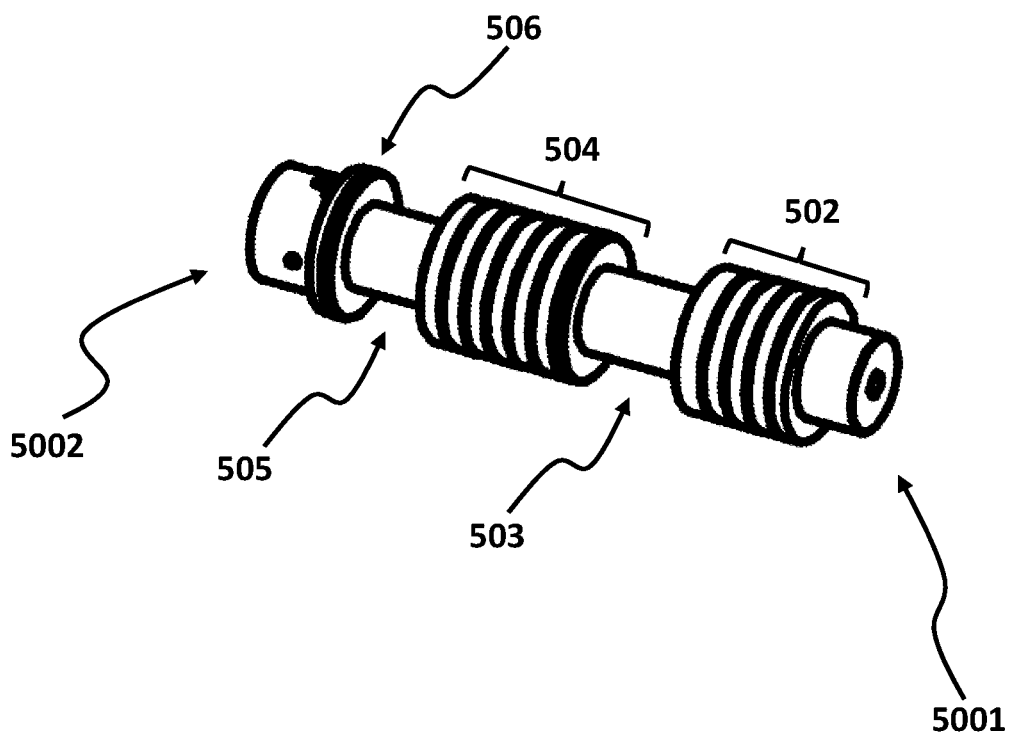
FIG. 5A illustrates a perspective view of a spool, consistent with one or more exemplary embodiments of the present disclosure.
Figure 5B:
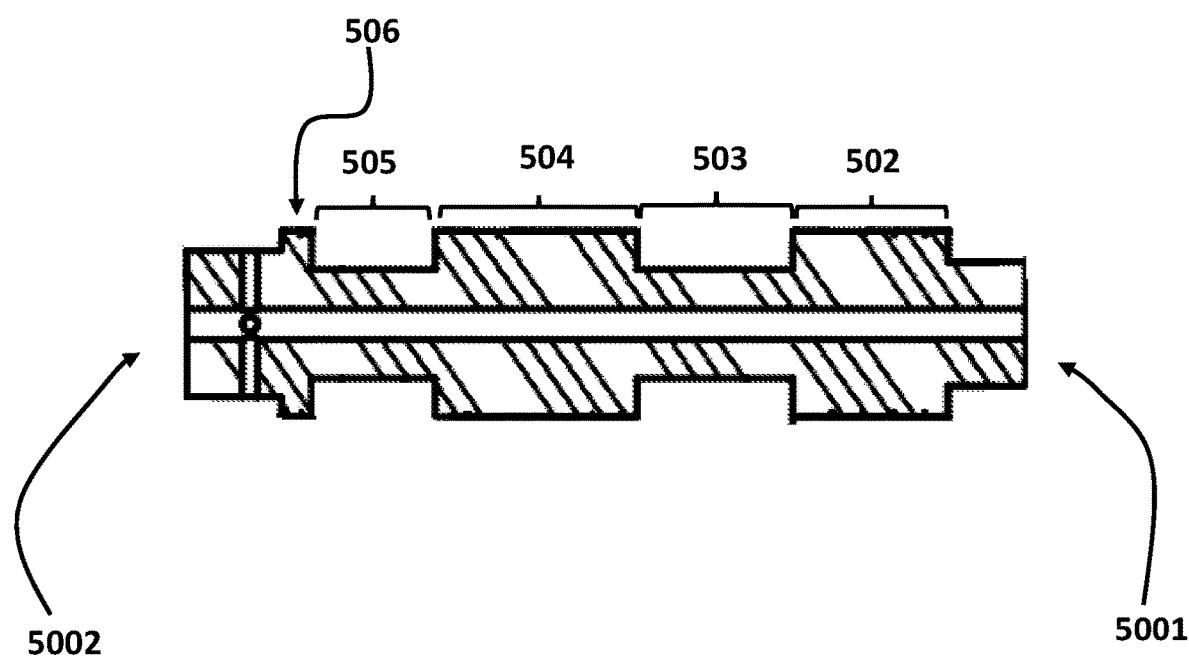
FIG. 5B illustrates a side view of a spool, consistent with one or more exemplary embodiments of the present disclosure.

FIG. 5A shows a perspective view of spool 150, consistent with one or more exemplary embodiments of the present disclosure. FIG. 5B shows a side view of spool 150, consistent with one or more exemplary embodiments of the present disclosure. As shown in FIG. 5A and FIG. 5B, in an exemplary embodiment, spool 150 may include a first sealing part 502, a second sealing part 504, and a middle sealing part 506. In an exemplary embodiment, an outer diameter of first sealing part 502, an outer diameter of second sealing part 504, and an outer diameter of middle sealing part 506 may correspond to an inner diameter of hollow chamber 104. In an exemplary embodiment, first sealing part 502 may be placed at a first end 5001 of spool 150. In an exemplary embodiment, second sealing part 504 may be placed at a second end 5002 of spool 150. In an exemplary embodiment, middle sealing part 506 may be placed at a middle of spool 150.

As further shown in FIG. 5A and FIG. 5B, in an exemplary embodiment, spool 150 may further include a first circular gap 503 and a second circular gap 505. In an exemplary embodiment, first circular gap 503 may be placed between first sealing part 502 and middle sealing part 506.

In an exemplary embodiment, second circular gap 505 may be placed between second sealing part 504 and middle sealing part 506.

In an exemplary embodiment, spool 150 may be placed at two different positions inside hollow chamber 104. According to a first scenario, in an exemplary embodiment, spool 500 may be placed at a first end 1041 of hollow chamber 104. According to a second scenario, in an exemplary embodiment, spool 500 may be placed at a second end 1402 of hollow chamber 104. In an exemplary embodiment, first end 1401 of hollow chamber 104 may be associated with first end 5001 of spool 150.

Figure 6A:
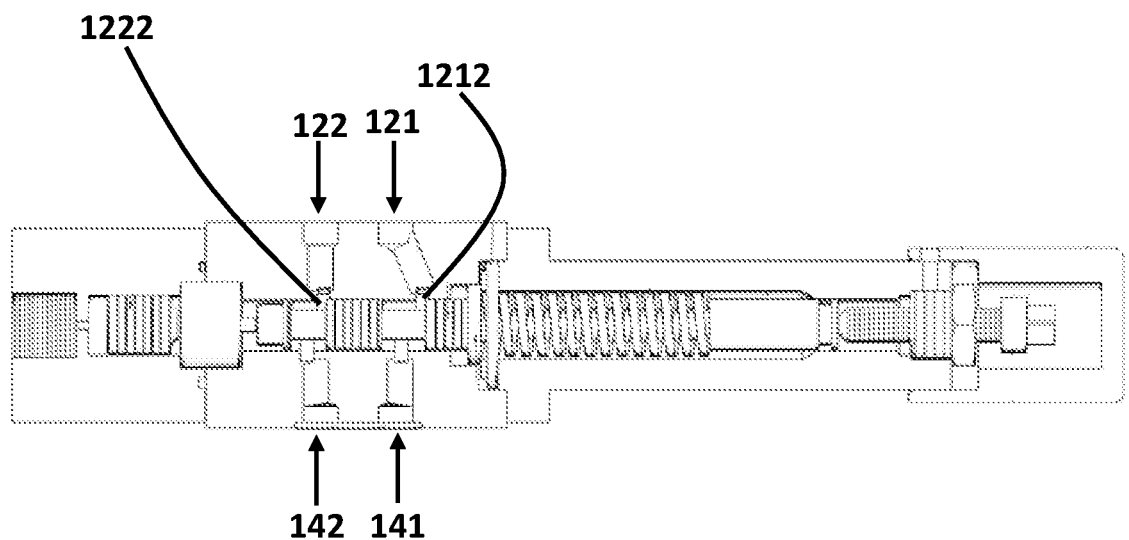
FIG. 6A illustrates a sectional view of a hydraulic directional control valve in a first scenario in which a spool is placed at a first end of a hollow chamber, consistent with one or more exemplary embodiments of the present disclosure.

FIG. 6A shows a sectional view of hydraulic directional control valve 100 in a first scenario in which spool 500 is placed at first end 1041 of hollow chamber 104, consistent with one or more exemplary embodiments of the present disclosure. As shown in FIG. 6A, in an exemplary embodiment, when spool 500 is placed at first end 1041 of hollow chamber 104, first circular gap 503 may be aligned with first top semicircular cavity 1212 and first bottom semicircular cavity 1412. In an exemplary embodiment, when first circular gap 503 is aligned with first top semicircular cavity 1212 and first bottom semicircular cavity 1412, first top port 121 and first bottom port 141 may become in fluid communication with each other. In fact, when first circular gap 503 is aligned with first top semicircular cavity 1212 and first bottom semicircular cavity 1412, first circular gap 503, first top semicircular cavity 1212, and first bottom semicircular cavity 1412 may become in fluid communication with each other and, to thereby, may provide fluid communication between first top port 121 and first bottom port 141.

As further shown in FIG. 6A, in an exemplary embodiment, when spool 500 is placed at first end 1041 of hollow chamber 104, second circular gap 505 may be aligned with second top semicircular cavity 1222 and second bottom semicircular cavity 1422. In an exemplary embodiment, when second circular gap 503 is aligned with second top semicircular cavity 1222 and second bottom semicircular cavity 1422, second top port 122 and second bottom port 142 may become in fluid communication with each other. In fact, when second circular gap 505 is aligned with second top semicircular cavity 1222 and second bottom semicircular cavity 1422, second circular gap 505, second top semicircular cavity 1222, and second bottom semicircular cavity 1422 may become in fluid communication with each other and, to thereby, may provide fluid communication between second top port 122 and second bottom port 142.

Figure 6B:
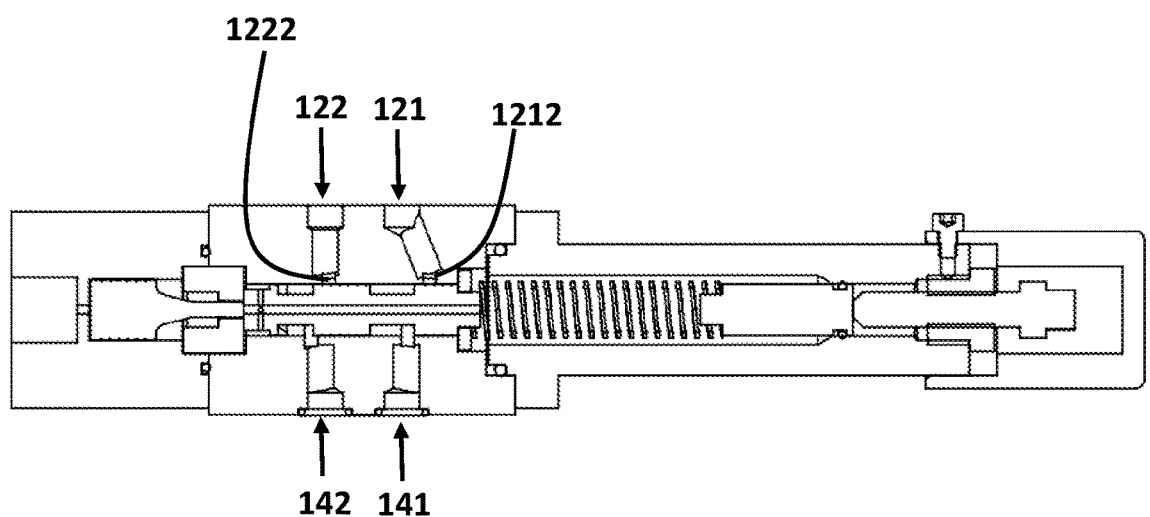
FIG. 6B illustrates a sectional view of a hydraulic directional control valve in a second scenario in which a spool is placed at a second end of a hollow chamber, consistent with one or more exemplary embodiments of the present disclosure.

FIG. 6B shows a sectional view of hydraulic directional control valve 100 in a second scenario in which spool 500 is placed at second end 1041 of hollow chamber 104, consistent with one or more exemplary embodiments of the present disclosure. In an exemplary embodiment, second end 1402 of hollow chamber 104 may be associated with second end 5002 of spool 150. As shown in FIG. 6B, in an exemplary embodiment, when spool 500 is placed at second end 1042 of hollow chamber 104, first circular gap 503 may be misaligned with first top semicircular cavity 1212 and first sealing part 502 may block first top semicircular cavity 1212 and first top port 121. In an exemplary embodiment, when spool 500 is placed at second end 1042 of hollow chamber 104, second circular gap 505 may be misaligned with second top semicircular cavity 1222 and second sealing part 504 may block second top semicircular cavity 1222 and second top port 122. In an exemplary embodiment, when spool 500 is placed at second end 1042 of hollow chamber 104, first bottom port 141 may be connected to first connecting hole 402 and, thereby, first bottom port 141 and first connecting hole 402 may become in fluid communication. Also, in an exemplary embodiment, when spool 500 is placed at second end 1042 of hollow chamber 104, second bottom port 142 may be connected to second connecting hole 404 and, thereby, second bottom port 142 and second connecting hole 404 may become in fluid communication.

Figure 6C:
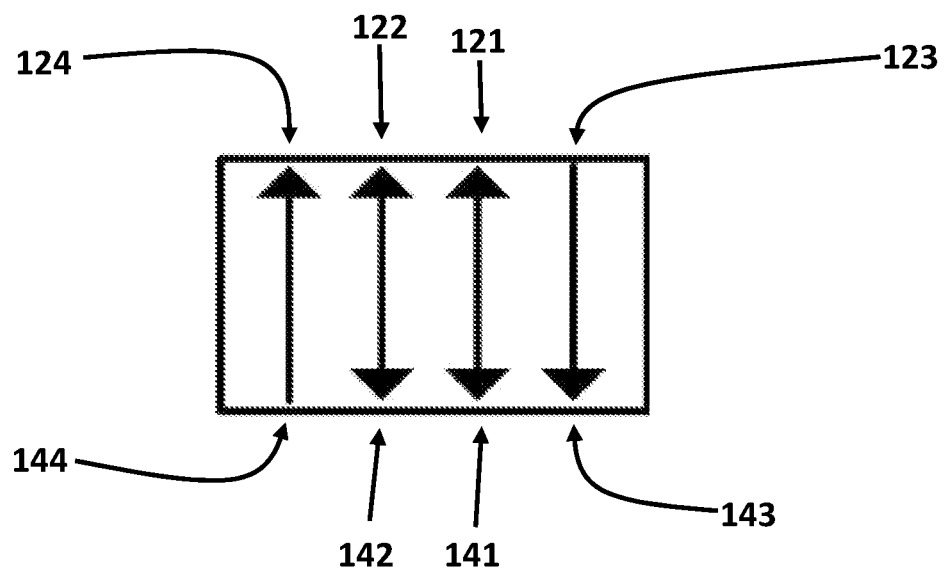
FIG. 6C illustrates a schematic diagram of a hydraulic directional control valve in a first scenario in which a spool is placed at a first end of a hollow chamber, consistent with one or more exemplary embodiments of the present disclosure.

FIG. 6C shows a schematic diagram of hydraulic directional control valve 100 in the first scenario in which spool 500 is placed at first end 1041 of hollow chamber 104, consistent with one or more exemplary embodiments of the present disclosure. In an exemplary embodiment, the first scenario may refer to working position. As shown in FIG. 6C, in an exemplary embodiment, when spool 500 is placed at first end 1041 of hollow chamber 104, first top port 121 and first bottom port 141 may be in fluid communication with each other. In an exemplary embodiment, fluid may go from first top port 121 to first bottom port 141 and/or fluid may go from first bottom port 141 to first top port 121. Furthermore, second top port 122 and second bottom port 142 may be in fluid communication with each other. In an exemplary embodiment, fluid may go from second top port 122 to second bottom port 142 and/or fluid may go from second bottom port 142 to second top port 122. In an exemplary embodiment, in the first scenario, third top port 123 and third bottom port 143 may be in fluid communication with each other. In an exemplary embodiment, fluid may go from third top port 123 to third bottom port 143. In an exemplary embodiment, in the first scenario, fourth top port 124 and fourth bottom port 144 may be in fluid communication with each other. In an exemplary embodiment, fluid may go from fourth bottom port 144 to fourth top port 124.

Figure 6D:
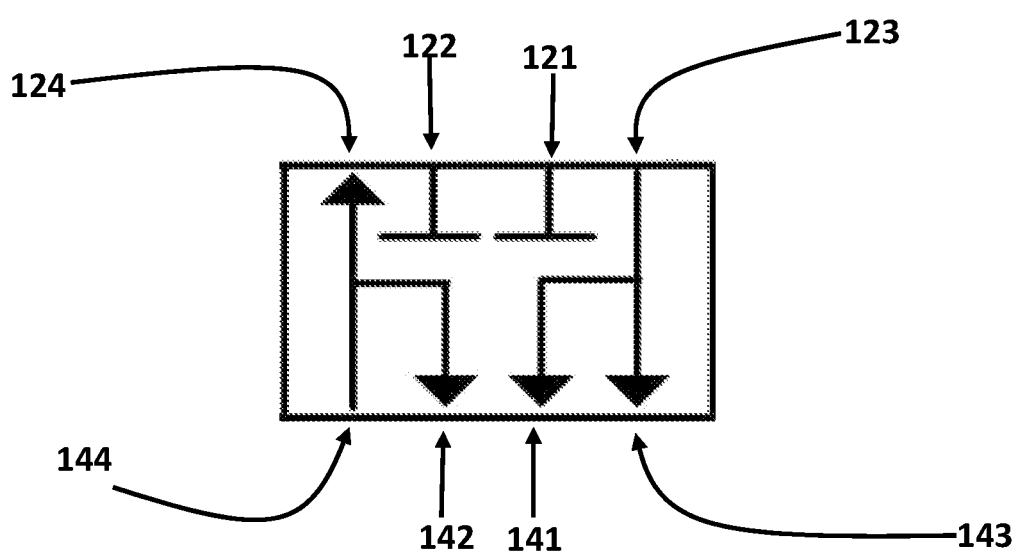
FIG. 6D illustrates a schematic diagram of a hydraulic directional control valve in a second scenario in which a spool is placed at a second end of a hollow chamber, consistent with one or more exemplary embodiments of the present disclosure.

FIG. 6D shows a schematic diagram of hydraulic directional control valve 100 in the second scenario in which spool 500 is placed at second end 1042 of hollow chamber 104, consistent with one or more exemplary embodiments of the present disclosure. In an exemplary embodiment, the second scenario may refer to shutdown position. As shown in FIG. 6D, in an exemplary embodiment, when spool 500 is placed at second end 1042 of hollow chamber 104, first top port 121 and second top port 122 may be blocked. In an exemplary embodiment, in the second scenario, first bottom port 141 may be in fluid communication with third top port 123 and third bottom port 143. Also, second bottom port 142 may be in fluid communication with fourth top port 124 and fourth bottom port 144.

As further shown in FIG. 1D, FIG. 6A, and FIG. 6B, in an exemplary embodiment, hydraulic directional control valve 100 may further include a spring 106 and a control piston 107. In an exemplary embodiment, in a control valve, control piston may refer to a piston that may urge a spool to move and, to thereby, control fluid flow in the control valve. In an exemplary embodiment, spring 106 may be attached to first end 5001 of spool 500. In an exemplary embodiment, spring 106 may urge spool 500 to move linearly along first axis 151 and in a first direction 152 by applying a spring force to first end 5001 of spool 500. In an exemplary embodiment, control piston 107 may be attached to second end 5002 of spool 500. In an exemplary embodiment, control piston 107 may urge spool 500 to move linearly along first axis 151 and in a second direction 153 by applying a piston force to second end 5002 of spool 500. In an exemplary embodiment, the pistol force may refer to a force that is applied from a control piston to a spool. In an exemplary embodiment, control piston 107 may be in connection with an amount of hydraulic oil. In an exemplary embodiment, the pressure of the hydraulic oil may urge control piston 107 to apply the piston force to second end 5002 of spool 500.

In an exemplary embodiment, when the piston force is greater than the spring force, spool 500 may be placed at first end 1041 of hollow chamber 104. In an exemplary embodiment, when spool 500 is placed at first end 1041 of hollow chamber 104, hydraulic directional control valve 100 may be in the first scenario which may be associated with a working position, that is, a position in which third top port 123 and third bottom port 143 are in fluid communication with each other and fluid may go from third top port 123 to third bottom port 143, and also fourth top port 124 and fourth bottom port 144 are in fluid communication with each other and fluid may go from fourth bottom port 144 to fourth top port 124. In an exemplary embodiment, when the spring force is greater than the piston force, spool 500 may be placed at second end 1042 of hollow chamber 104. In an exemplary embodiment, when spool 500 is placed at second end 1042 of hollow chamber 104, hydraulic directional control valve 100 may be in the second scenario which may be associated with shutdown position, that is, a position in which first bottom port 141 is in fluid communication with third top port 123 and third bottom port 143 and also, second bottom port 142 is in fluid communication with fourth top port 124 and fourth bottom port 144.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Ends 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A pilot operated hydraulic directional control valve for hydraulic systems, the hydraulic directional control valve comprising:

a valve body with a hollow chamber, the valve body comprising:
    a first top port provided at a top surface of the valve body, the first top port in fluid communication with an outer space of the valve body;
    a first top semicircular cavity located between the first top port and the hollow chamber, the first top semicircular cavity configured to provide fluid communication between the first top port and the hollow chamber;
    a first bottom port provided at a bottom surface of the valve body, the first bottom port associated with the first top port, the first bottom port in fluid communication with the outer space of the valve body;
    a first bottom semicircular cavity located between the first bottom port and the hollow chamber, the first bottom semicircular cavity configured to provide fluid communication between the first bottom port and the hollow chamber;

a second top port provided at the top surface of the valve body, the second top port in fluid communication with the outer space of the valve body;

a second top semicircular cavity located between the second top port and the hollow chamber, the second top semicircular cavity configured to provide fluid communication between the second top port and the hollow chamber;

a second bottom port provided at the bottom surface of the valve body, the second bottom port associated with the second top port, the second bottom port in fluid communication with the outer space of the valve body;

a second bottom semicircular cavity located between the second bottom port and the hollow chamber, the second bottom semicircular cavity configured to provide fluid communication between the second bottom port and the hollow chamber;

a third top port provided at the top surface of the valve body, the third top port in fluid communication with an outer space of the valve body;

a third bottom port provided at the bottom surface of the valve body, the third bottom port associated with the third top port, the third bottom port in fluid communication with the outer space of the valve body;

a first connecting hole provided between the third top port and the third bottom port, the first connecting hole configured to provide fluid communication between the third top port and the third bottom port;

a fourth top port provided at the top surface of the valve body, the fourth top port in fluid communication with the outer space of the valve body;

a fourth bottom port provided at the bottom surface of the valve body, the fourth bottom port associated with the fourth top port, the fourth bottom port in fluid communication with the outer space of the valve body; and a second connecting hole provided between the fourth top port and the fourth bottom port, the second connecting hole configured to provide fluid communication between the fourth top port and the fourth bottom port; and a spool disposed slidably inside the hollow chamber, an outer diameter of the spool corresponding to an inner diameter of the hollow chamber, the spool comprising:

a first sealing part at a first end of the spool, an outer diameter of the first sealing part corresponding to the inner diameter of the hollow chamber;

a second sealing part at a second end of the spool, an outer diameter of the second sealing part corresponding to the inner diameter of the hollow chamber;

a middle sealing part at a middle of the spool, an outer diameter of the middle sealing part corresponding to the inner diameter of the hollow chamber;

a first circular gap between the first sealing part and the middle sealing part; and a second circular gap between the second sealing part and the middle sealing part;

wherein:

responsive to the spool being placed at a first end of the hollow chamber:

the first circular gap is aligned with the first top semicircular cavity and the first bottom semicircular cavity and, thereby, the first circular gap, the first top semicircular cavity, and the first bottom semicircular cavity provide fluid communication between the first top port and the first bottom port; and the second circular gap is aligned with the second top semicircular cavity and the second bottom semicircular cavity and, thereby, the second circular gap, the second top semicircular cavity, and the second bottom semicircular cavity provide fluid communication between the first top port and the first bottom port; and responsive to the spool being placed at a second end of the hollow chamber:

the first circular gap is misaligned with the with the first top semicircular cavity;

the first sealing part blocks the first top semicircular cavity and the first top port;

the second circular gap is misaligned with the second top semicircular cavity;

the second sealing part blocks the second top semicircular cavity and the second top port; and the second bottom port is connected to the second connecting hole.

2. The pilot operated hydraulic directional control valve of claim 1, wherein the spool is configured to move linearly inside the hollow chamber along a first axis, the first axis corresponding to a main longitudinal axis of the hollow chamber.

3. The pilot operated hydraulic directional control valve of claim 2, further comprising:

a spring attached to a first end of the spool, the spring configured to urge the spool to move linearly along the first axis and in a first direction by applying a spring force to the first end of the spool; and a control piston attached to a second end of the spool, the control piston configured to urge the spool to move linearly along the first axis in a second direction by applying a piston force to the second end of the spool.

4. The pilot operated hydraulic directional control valve of claim 3, wherein: the spring and the control piston are configured to place the spool at the first end of the hollow chamber responsive to the piston force being greater than the spring force; and the spring and the control piston are configured to place the spool at the second end of the hollow chamber responsive to the spring force being greater than the piston force.

5. The pilot operated hydraulic directional control valve of claim 4, wherein the first top port comprises an inclined tube, the inclined tube directly connected to the first top semicircular cavity.

6. The pilot operated hydraulic directional control valve of claim 5, wherein the valve body further comprises an inclined connecting hole between the fourth bottom port and the hollow chamber.

* * * * *